United States Patent
Park et al.

(10) Patent No.: US 12,119,522 B2
(45) Date of Patent: Oct. 15, 2024

(54) FUEL CELL VEHICLE AND METHOD FOR CONTROLLING POWER GENERATION FOR THE SAME

(71) Applicants: HYUNDAI MOTOR COMPANY, Seoul (KR); KIA MOTORS CORPORATION, Seoul (KR)

(72) Inventors: Jeong Kyu Park, Yongin-si (KR); Jae Hoon Jeong, Seoul (KR); Sae Byeok Seung, Yongin-si (KR); Hyo Jun Kim, Gunpo-si (KR); Sang Chul Yeom, Yongin-si (KR); Seung Yoon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 346 days.

(21) Appl. No.: 16/821,033

(22) Filed: Mar. 17, 2020

(65) Prior Publication Data

US 2021/0111422 A1    Apr. 15, 2021

(30) Foreign Application Priority Data

Oct. 15, 2019    (KR) .......................... 10-2019-0128055

(51) Int. Cl.
*H01M 8/04* (2016.01)
*B60L 50/75* (2019.01)
(Continued)

(52) U.S. Cl.
CPC ......... *H01M 8/04626* (2013.01); *B60L 50/75* (2019.02); *B60L 58/40* (2019.02);
(Continued)

(58) Field of Classification Search
CPC .......... B60L 58/40; B60L 50/75; B60K 6/28; B60Y 2200/92; B60Y 2200/91
See application file for complete search history.

(56) References Cited

U.S. PATENT DOCUMENTS 6,847,127 B1    1/2005    Lee
7,173,397 B2 *  2/2007    Kinoshita ............... B60L 58/10
                                                          320/134
(Continued)

FOREIGN PATENT DOCUMENTS

CN         1368776     *  9/2002    ............... H02J 7/10
CN     104051764 A        9/2014
(Continued)

OTHER PUBLICATIONS

Machine-generated translation of CN 1368776, Ju Du, "A Fast Charging Device And Application Thereof", Sep. 11, 2002.*

(Continued)

*Primary Examiner* — Raymond Alejandro
(74) *Attorney, Agent, or Firm* — MORGAN, LEWIS & BOCKIUS LLP

(57) ABSTRACT

A fuel cell vehicle and a method for controlling power generation for the same are provided. The fuel cell includes a motor supplying driving power for driving the fuel cell vehicle, a fuel cell and a battery supplying electrical power for driving the motor, and a vehicle controller for operating the fuel cell in advance by predicting a shortage of discharge power of the battery by monitoring the discharge power of the battery.

10 Claims, 7 Drawing Sheets

(51) Int. Cl.
  *B60L 58/40* (2019.01)
  *H01M 8/04302* (2016.01)
  *H01M 8/04303* (2016.01)
  *H01M 8/04537* (2016.01)
  *H01M 8/04858* (2016.01)
  *H01M 8/04955* (2016.01)
  *H01M 16/00* (2006.01)
  *B60K 6/28* (2007.10)

(52) U.S. Cl.
  CPC ... *H01M 8/04302* (2016.02); *H01M 8/04303* (2016.02); *H01M 8/04932* (2013.01); *H01M 8/04947* (2013.01); *H01M 8/04955* (2013.01); *H01M 16/006* (2013.01); *B60K 6/28* (2013.01); *B60Y 2200/91* (2013.01); *B60Y 2200/92* (2013.01); *H01M 2220/20* (2013.01); *H01M 2250/20* (2013.01)

(56) References Cited

U.S. PATENT DOCUMENTS

| | | | |
|---|---|---|---|
| 9,242,573 | B2 | 1/2016 | Lee et al. |
| 10,056,628 | B2 | 8/2018 | Kim et al. |
| 10,532,666 | B2 | 1/2020 | Yoon et al. |
| 10,714,776 | B2 | 7/2020 | Kumada et al. |
| 10,976,711 | B2 | 4/2021 | Egawa et al. |
| 2004/0251875 | A1 | 12/2004 | Kinoshita et al. |
| 2009/0160252 | A1 | 6/2009 | Kojima et al. |
| 2010/0332060 | A1 | 12/2010 | Bae et al. |
| 2015/0105952 | A1 | 4/2015 | Lee et al. |
| 2017/0222238 | A1 | 8/2017 | Kumada et al. |
| 2017/0294666 | A1 | 10/2017 | Kim et al. |
| 2017/0305286 | A1 | 10/2017 | Kim |
| 2018/0236883 | A1* | 8/2018 | Kokubo ............ H01M 8/04932 |
| 2018/0326865 | A1 | 11/2018 | Yoon et al. |
| 2019/0152330 | A1 | 5/2019 | Lee et al. |
| 2019/0267650 | A1 | 8/2019 | Egawa et al. |

FOREIGN PATENT DOCUMENTS

| | | |
|---|---|---|
| CN | 104553841 A | 4/2015 |
| CN | 106663829 A | 5/2017 |
| CN | 107264299 A | 10/2017 |
| CN | 108340794 A | 7/2018 |
| CN | 110190308 A | 8/2019 |
| JP | 2016-174519 A | 9/2016 |
| KR | 10-2004-0001776 A | 1/2004 |
| KR | 10-2010-0013313 A | 2/2010 |
| KR | 10-2013-0055889 A | 5/2013 |
| KR | 10-2018-0125059 A | 11/2018 |

OTHER PUBLICATIONS

Office Action issued in corresponding Chinese Patent Application No. 202010275704.5 on Oct. 30, 2023, with English translation.
Haitao Yun, et al., "Energy Control Strategy for Fuel Cell Hybrid Forklift", Journal of Xinjiang University (Natural Science Edition), vol. 35, No. 2, May 2018, 7 pages.
Notice of Allowance issued in corresponding Korean Patent Application No. 10-2019-0128055 issued Jun. 7, 2024, with English translation.

* cited by examiner

| BOL (kW) | | SOC (%) | | | | | | | | | | |
|---|---|---|---|---|---|---|---|---|---|---|---|---|
| | | 0 | 10 | 20 | 30 | 40 | 50 | 60 | 70 | 80 | 90 | 100 |
| Temp (°C) | -30 | 0 | Max*0.1 | Max*0.1 | Max*0.2 | Max*0.2 | Max*0.2 | Max*0.2 | Max*0.3 | Max*0.3 | Max*0.3 | Max*0.3 |
| | -20 | 0 | Max*0.1 | Max*0.2 | Max*0.2 | Max*0.4 | Max*0.5 | Max*0.6 | Max*0.6 | Max*0.6 | Max*0.7 | Max*0.7 |
| | -10 | 0 | Max*0.2 | Max*0.4 | Max*0.4 | Max*0.5 | Max*0.6 | Max*0.9 | Max*0.9 | Max | Max | Max |
| | 0 | 0 | Max*0.3 | Max*0.6 | Max*0.7 | Max*0.7 | Max*0.9 | Max | Max | Max | Max | Max |
| | 10 | 0 | Max*0.4 | Max*0.7 | Max*0.9 | Max*0.9 | Max | Max | Max | Max | Max | Max |
| | 20 | 0 | Max*0.5 | Max*0.9 | Max | Max | Max | Max | Max | Max | Max | Max |
| | 30 | 0 | Max*0.9 | Max | Max | Max | Max | Max | Max | Max | Max | Max |
| | 40 | 0 | Max | Max | Max | Max | Max | Max | Max | Max | Max | Max |
| | 50 | 0 | Max*0.7 | Max*0.7 | Max*0.7 | Max*0.7 | Max*0.7 | Max*0.7 | Max*0.7 | Max*0.7 | Max*0.7 | Max*0.7 |
| | 60 | 0 | 0 | 0 | 0 | 0 | 0 | 0 | 0 | 0 | 0 | 0 |

FIG. 3

FUEL CELL VEHICLE AND METHOD FOR CONTROLLING POWER GENERATION FOR THE SAME

CROSS-REFERENCE TO RELATED APPLICATION

The present application claims the benefit of priority to Korean Patent Application No. 10-2019-0128055, filed on Oct. 15, 2019 in the Korean Intellectual Property Office, the entire disclosure of which is incorporated herein by reference.

TECHNICAL FIELD

The present disclosure relates to a fuel cell vehicle and a method for controlling power generation for the same.

BACKGROUND

A fuel cell vehicle refers to a vehicle employing a fuel cell which generates power through an electrochemical reaction between hydrogen and air, as a driving power source. In other words, the fuel cell vehicle drives a motor of the vehicle by using the electrical power generated from the fuel cell. Such a fuel cell vehicle determines a use amount of power of the fuel cell by taking into consideration only a reference value of discharge power (discharge output) of a battery. When a state of charge (SOC) of the battery is lowered, when the battery is consecutively used under high power (high current), or when the temperature of external air is low, the discharge power of the battery is lowered to a specific value or less from the maximum (Max) value to protect the battery. In this case, when a driver presses an accelerator pedal for accelerating, the fuel cell operation is delayed in a state in which the power of the battery discharge is reduced, thereby causing a problem in that the motor does not sufficiently supply the necessary power. For example, when the driving mode of the fuel cell vehicle is shifted from an electric vehicle (EV) to a hybrid electric vehicle (HEV), since the fuel cell vehicle operates a fuel cell based on only the reference value for the discharge power (battery discharge power) of the battery, an acceleration delay may be caused. As illustrated in FIG. 1, the battery discharge power sharply decreases according to a specific discharge power decrease slope D from the time point 'a' at which the discharge power of the battery is reduced, and the fuel cell is restarted as a command for operating the fuel cell is transmitted from a time point 'b' at which the battery discharge power is equal to or less than a specific value. When the fuel cell receives the fuel cell operation command at the time point 'b', re-starting is completed for a 'b-c' duration, and power is increased for a 'c-d' duration, thereby generating 100% of power. Therefore, as a driver presses the accelerator pedal for the b-d duration to try the acceleration, acceleration may be delayed due to the shortage of the battery.

The above information disclosed in this Background section is only for enhancement of understanding of the background of the present disclosure, and should not be taken as acknowledgement that this information forms the prior art that is already known to a person skilled in the art.

SUMMARY

The present disclosure has been made to solve the above-mentioned problems occurring in the prior art while advantages achieved by the prior art are maintained intact.

An aspect of the present disclosure provides a fuel cell vehicle capable of predicting a shortage possibility of discharge power (battery discharge power) of a battery by monitoring the battery discharge power and operating a fuel cell in advance before the shortage of available power of the battery, such that acceleration of the vehicle is performed without delay due to the shortage of the available power of the fuel cell and the battery, and a method for controlling power generation for the same.

Another aspect of the present disclosure provides a fuel cell vehicle capable of controlling the reduction slope (discharge power reduction slope) of the discharge power based on the battery discharge power when a fuel cell is operated by predicting the shortage of battery discharge power, thereby ensuring a time such that the fuel cell generates power required by a motor, and a method for controlling power generation for the same, The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a fuel cell vehicle includes a motor configured to supply driving power for vehicle driving, a fuel cell and a battery configured to supply electrical power for driving the motor, and a vehicle controller configured to operate the fuel cell in advance by predicting shortage of discharge power of the battery by monitoring the discharge power of the battery.

The vehicle controller determines that the shortage of the discharge power of the battery is predicted when the battery is discharged for a preset reference time or more with a preset reference current or more.

The fuel cell vehicle further includes a fuel cell controller configured to control an operation of the fuel cell, and the vehicle controller transmits a fuel cell operation command to the fuel cell controller to operate the fuel cell controller, when the shortage of the discharge power of the battery is predicted.

The vehicle controller determines a time point for transmitting the fuel cell operation command, based on maximum discharge power of the battery and present discharge power of the battery.

The vehicle controller changes a discharge power decrease slope of the battery, based on maximum discharge power of the battery and present discharge power of the battery.

The vehicle controller decreases the discharge power of the battery based on the discharge power decrease slope of the battery, at a time point at which the discharge power of the battery begins to decrease.

The vehicle controller determines whether the battery is able to discharge power as the maximum discharge power, and recovers the discharge power of the battery to a default value when the battery is able to discharge the power as the maximum discharge power.

The vehicle controller determines whether to stop the operation of the fuel cell by comparing a State of Charge (SOC) of the battery with a reference SOC.

The vehicle controller stops the operation of the fuel cell when the SOC of the battery exceeds the reference SOC.

The vehicle controller maintains the operation of the fuel cell when the SOC of the battery does not exceed the reference SOC.

According to an aspect of the present disclosure, a method for controlling power generation for a fuel cell vehicle, the method includes predicting a shortage of discharge power of a battery by monitoring the discharge power of the battery during vehicle driving, and operating a fuel cell in advance when the shortage of the discharge power of the battery is predicted.

The predicting a shortage of discharge power of a battery includes determining that the shortage of the discharge power of the battery is predicted when the battery is discharged for a preset reference time or more with a preset reference current or more.

The operating a fuel cell in advance includes transmitting a fuel cell operation command and changing a discharge power decrease slope of the battery when the shortage of the discharge power of the battery is predicted, and decreasing the discharge power of the battery based on the discharge power decrease slope of the battery.

The fuel cell operation command is transmitted at a transmission time point determined based on maximum discharge power and present discharge power of the battery.

The discharge power decrease slope of the battery is determined based on maximum discharge power and present discharge power of the battery.

The method further includes recovering the discharge power of the battery to a default value when the battery is able to discharge power as maximum discharge power, after decreasing the discharge power of the battery.

The method further includes determining whether to stop an operation of the fuel cell based on a state of the battery, after decreasing the discharge power of the battery.

The determining whether to stop an operation of the fuel cell includes detecting an SOC of the battery, comparing the SOC of the battery with a reference SOC, and controlling stopping of the operation of the fuel cell based on the SOC of the battery and the reference SOC.

The controlling stopping of the operation of the fuel cell includes stopping the operation of the fuel cell when the SOC of the battery exceeds the reference SOC.

The controlling stopping of the operation of the fuel cell includes maintaining the operation of the fuel cell when the SOC of the battery does not exceed the reference SOC.

BRIEF DESCRIPTION OF THE DRAWINGS

The above and other objects, features and advantages of the present disclosure will be more apparent from the following detailed description taken in conjunction with the accompanying drawings:

FIG. 3 is a view illustrating a map for the battery discharge power associated with the present disclosure;

DETAILED DESCRIPTION

Figure 1:
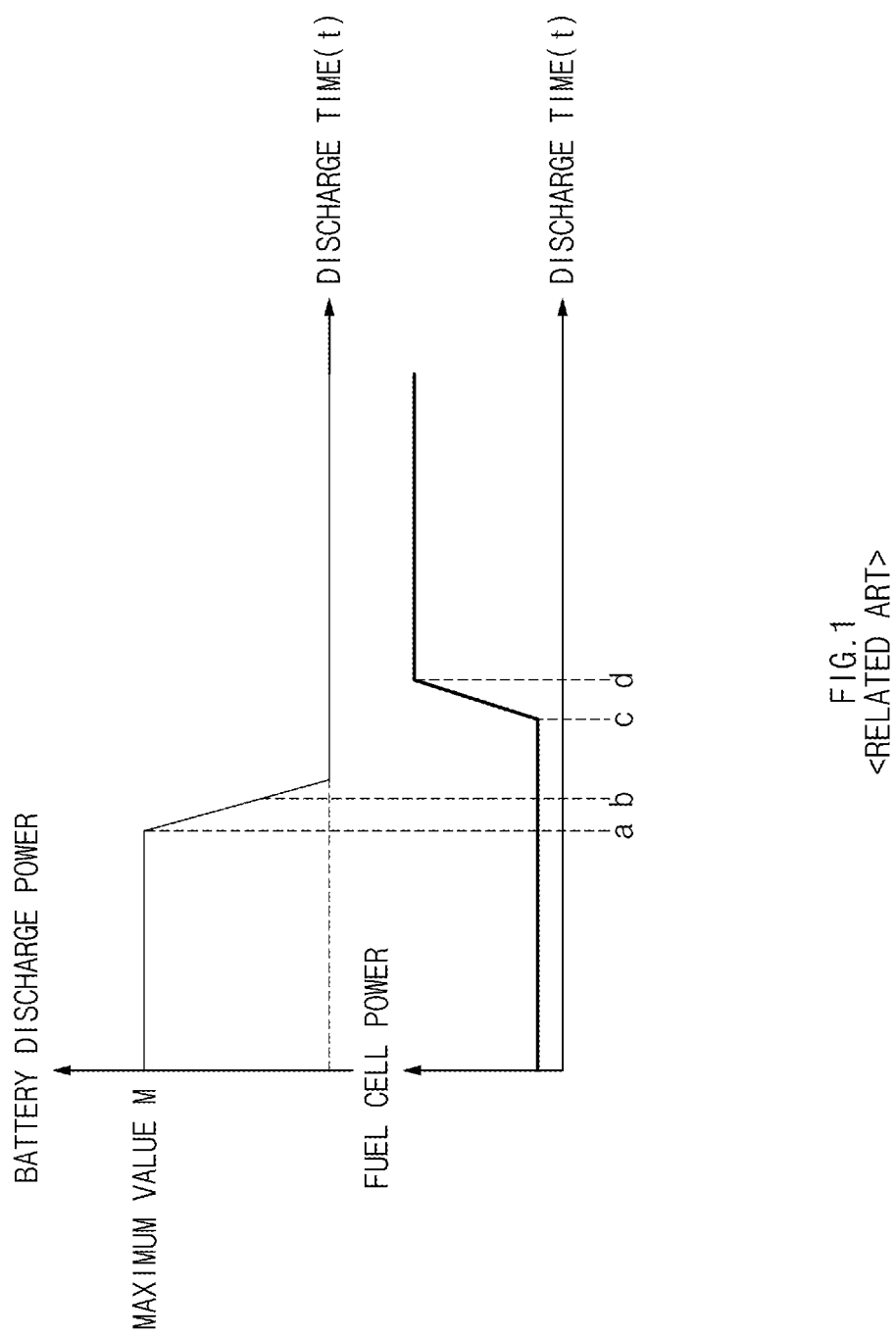
FIG. 1 is a graph illustrating battery discharge power and the power of a fuel cell, according to the related art.

Hereinafter, some exemplary embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of exemplary embodiments of the present disclosure, a detailed description of well-known features or functions will be ruled out in order not to unnecessarily obscure the gist of the present disclosure.

In describing the components of the exemplary embodiments of the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
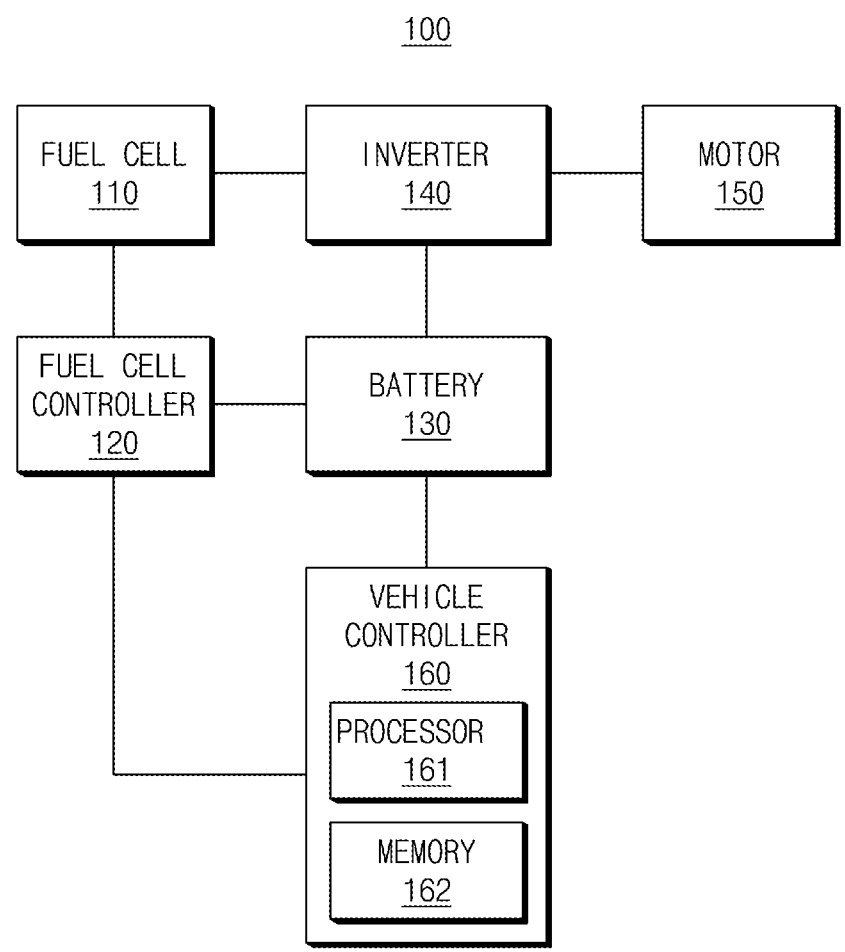
FIG. 2 is a block diagram illustrating a fuel cell vehicle, according to an exemplary embodiment of the present disclosure.
Figure 4:
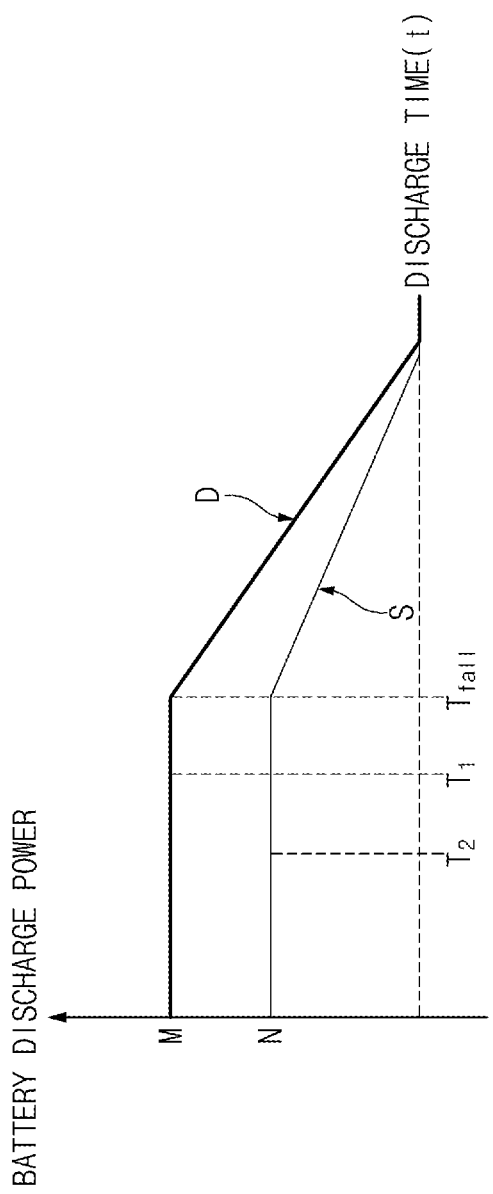
FIG. 4 is a graph illustrating the battery discharge power as a function of a battery discharge time, according to an exemplary embodiment of the present disclosure.

FIG. 2 is a block diagram illustrating a fuel cell vehicle, according to an exemplary embodiment of the present disclosure, FIG. 3 is a view illustrating a map for battery discharge map associated with the present disclosure, and FIG. 4 is a graph illustrating battery discharge power as a function of a battery discharge time, according to an exemplary embodiment of the present disclosure.

Referring to FIG. 2, a fuel cell vehicle (hereinafter, a vehicle) 100 includes a fuel cell 110, a fuel cell controller 120, a battery 130, an inverter 140, a motor 150, and a vehicle controller 160.

The fuel cell 110 allows oxygen to chemically react with hydrogen to generate electrical energy (power). A reverse current protection circuit may be configured at an output terminal of the fuel cell 110 to protect the fuel cell 110 from reverse current.

The fuel cell controller 120 controls the overall operation of the fuel cell 110 under a direction (an instruction, command) of the vehicle controller 160. In other words, the fuel cell controller 120 may operate the fuel cell 110 to generate electricity or stop (pause) the operation of the fuel cell 110. Although not illustrated in the drawings, the fuel cell controller 120 may include a non-transitory memory storing a program(s) that, when executed a processor, programmed to perform various tasks.

The fuel cell controller 120 may inspect the state of the fuel cell 110 when operating the fuel cell 110. The fuel cell controller 120 controls the operation of the fuel cell 110 to generate the maximum power (that is, 100% of power) when the state of the fuel cell 110 is normal. Meanwhile, the fuel cell controller 120 stops the operation of the fuel cell 110 or outputs the cause of stopping the operation of the fuel cell 110 in the form that a user recognizes the cause, when the state of the fuel cell 110 is abnormal.

The battery 130 stores (charges) electrical energy or releases (discharges) stored electrical energy. The battery 130 may store power generated by the motor 150 when regenerative braking is performed. The battery 130 may be implemented with a high voltage battery. The battery 130 may include a power converter that controls the input and output of the battery 130. The power converter controls output power, which is output from the battery 130, or input power which is input to the battery 130. For example, the power converter converts a voltage output from the battery 130 into a voltage required to drive the motor and transmits the required voltage to the inverter 140, or converts an input voltage input to the battery 130 into charging voltage required to charge the battery 130.

The fuel cell 110 and the battery 130 are energy sources for supplying power required to drive the motor 150 in the vehicle 100. The driving mode of the vehicle 100 is determined depending on the energy source (driving power source or source of motive power) used for driving the motor. The driving mode may be classified into a fuel cell mode for using only the power of the fuel cell 110, an electric vehicle (EV) mode for using only the power of the battery 130, and a hybrid electric vehicle (HEV) mode for using the power of the fuel cell 110 and the battery 130.

The inverter 140 converts the high voltage DC power supplied from the fuel cell 110 and/or the battery 130 into power (AC or DC) in a specific level required to drive the motor. For example, the inverter 140 may convert the high voltage output from the fuel cell 110 and/or the battery 130 into a 3-phase AC voltage.

The motor 150 is an electrical motor driven by receiving power through the inverter 140. The motor 150 generates driving power required to drive the vehicle by using the power of the fuel cell 110 and/or the battery 130. The motor 150 is driven according to a direction (e.g., drive torque) of the vehicle controller 160.

The vehicle controller 160 controls the overall operation of the vehicle 100. The vehicle controller 160 includes a processor 161 and a non-transitory memory 162. The processor 161 may include at least one of an Application Specific Integrated Circuit (ASIC), a Digital Signal Processor (DSP), a Programmable Logic Device (PLD), Field Programmable Gate Arrays (FPGAs), a Central Processing unit (CPU), microcontrollers, and/or microprocessors. The storage 162 may store software programmed such that the processor 161 performs a preset operation. The memory 162 may store input data and/or output data based on the operation of the processor 161. The memory 162 may be implemented with at least one of storage media such as a flash memory, a hard disk, a Security Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), and/or a register.

The memory 162 may store information on a battery specification and a map for battery discharge power based on the specification of the battery 130 mounted on the vehicle 100. The memory 162 may store the map for the battery discharge power as illustrated in FIG. 3. In FIG. 3, 'Max' may refer to the maximum discharge power 'M' (the maximum amount; the maximum value) of the battery 130 under a default condition, and the present maximum discharge power of the battery 130 may vary depending on the SOC of the battery 130 and the temperature of the battery 130. For example, when the vehicle first starts in the state that the external temperature is −10° C. and the SOC is 40%, the battery 130 may generate power corresponding to half of the maximum value 'Max'. In other words, the present discharge power 'N' of the battery 130 becomes Max×0.5. Alternatively, when the temperature of the battery 130 is increased to 50° C. or more as the vehicle 100 repeatedly accelerates or decelerates under a condition that the external air has the room temperature or more, the battery power (battery output) gradually and linearly decreases such that the present discharge power of the battery 130 decreases to the maximum value 'M'. Although FIG. 3 illustrates that the SOC and the temperature are sub-divided in unit of 10% and 10° C., respectively, the SOC and the temperature may be more sub-divided.

The processor 161 drives a vehicle in an EV mode while monitoring the discharge power of the battery 130. In other words, the processor 161 drives the motor 150 using power supplied from the battery 130 to monitor the power of the battery 130 in real time.

The processor 161 predicts (determines) the possibility of a shortage of the battery power, based on the discharge power of the battery 130. The processor 161 may determine whether the shortage of the discharge power of the battery 130 is predicted (expected), by monitoring the battery power. The processor 161 may determine that the shortage of the discharge power of the battery 130 is predicted, when the discharge power of the battery 130 satisfies a reference condition. In this case, the reference condition is a case where the battery 130 is continuously discharged for a preset reference time or more with a preset reference current or more, the reference current is set based on the battery specification, and the reference time is set by a system designer. For example, the processor 161 may determine that the shortage of the discharge power of the battery 130 is predicted, when the battery 130 uses the output current of 300 A or more for 20 seconds or more.

The processor 161 transmits, to the fuel cell controller 120, a signal (e.g., ON Flag) for instructing a fuel cell operation, when the shortage of the discharge power of the battery 130 is predicted (expected). In this case, the processor 161 determines a time point (that is, a fuel cell operation command time point TON [sec]) for generating a command for instructing the operation of the fuel cell through Equation 1. The processor 161 transmits a fuel cell operation command at the fuel cell operation command time point TON [sec].

$$T_{on} = T_{fall} - \frac{M}{N} \times 2(sec) \qquad \text{Equation 1}$$

In this case, '$T_{fall}$' is a time point at which the discharge power of the battery 130 is reduced (that is, the time point at which the discharge power is reduced), 'M' is the maximum discharge power of the battery 130, that is, the highest power value in the battery specification, and 'N' is the present maximum discharge power (hereinafter, the current discharge power) of the battery 130, depending on the battery temperature and the battery SOC. In this case, '$T_{fall}$' is a time point, at which the discharge power of the battery 130 is reduced, may be preset by the system designer.

For example, referring to FIG. 4, when the battery 130 outputs the maximum discharge power 'M', the processor 161 transmits the fuel cell operation command at the time point T1 earlier than the time point '$T_{fall}$' at which the discharge power of the battery 130 is reduced, When the present discharge power 'N' of the battery 130 is lower than the maximum discharge power 'M' of the battery 130, the processor 161 transmits the fuel cell operation command at the time point T2 earlier than the time point T1.

In addition, the processor 161 may change the slope (discharge power decrease slope of the battery 130) at which the discharge power of the battery 130 is reduced, that is, the speed at which the discharge power of the battery 130 is reduced. The discharge power reduction slope 'S' [Wms] of the battery 130 may be defined as in Equation 2.

$$S = \frac{D}{\left(\frac{M}{N}\right)^2} \qquad \text{Equation 2}$$

In this case, 'D' refers to a discharge power decrease slope under a default condition. In this case, 'D' is primarily selected by a software developer and confirmed by a performance test developer who performs fine tuning for the vehicle.

The processor 161 may similarly control a time at which the discharge power of the battery 130 reaches a preset minimum discharge power of the battery 130 regardless of the present discharge power of the battery 130, by variably controlling the discharge power decrease slope of the battery 139. In this case, the minimum discharge power may be preset by the system designer. For example, as illustrated in FIG. 4, when the discharge power of the battery 130 is reduced from 'M' to 'N', the processor 161 similarly controls the time at which the discharge power of the battery 130 reaches the minimum discharge power, by varying the discharge power decrease slope of the battery 130. According to an exemplary embodiment, the discharge power of the battery 130, which is sharply reduced within one to three seconds according to the related art, is slowly reduced within 10 seconds, thereby ensuring a time until the fuel cell system is normally operated.

When the discharge power of the battery 130 is predicted, the processor 161 may drive the vehicle 100 by reducing the discharge power of the battery 130 to be in a preset level (to be discharge power in the preset level). In this case, the processor 161 reduces the discharge power of the battery 130 according to the discharge power decrease slope S of the battery 130, which is determined through Equation 2. In addition, the processor 161 may operate the fuel cell 110 by transmitting the fuel cell operation command. The fuel cell controller 120 inspects the fuel cell system and operates the fuel cell 110 to reach the maximum power, when there is no abnormality in a result of the inspection.

The processor 161 determines whether the operating state of the fuel cell 110 and the state of the battery 130 are normal. In other words, the processor 161 determines whether the fuel cell 110 is operating, and whether the state, such as a temperature, a cell, and various sensors, of the battery 130 is normal. In other words, the processor 161 determines whether the battery 130 is in the state that the maximum discharge power is possible.

The processor 161 recovers the discharge power of the battery 130 to a default value (that is, the maximum discharge power 'M') when the battery 130 is in the state that is able to generate the maximum discharge power. In this case, the processor 161 increases the battery discharge power (battery power) based on a discharge power increase slope of the battery 130 obtained by multiplying the discharge power decrease slope of the battery 130, which is determined above, by a negative number.

The processor 161 determines whether to quit (stop) the operation of the fuel cell 110, based on the SOC of the battery 130, when the maximum discharge power of the battery 130 is possible. The processor 161 detects the SOC of the battery 130 and determines whether the detected SOC exceeds a reference SOC. The processor 161 stops the operation of the fuel cell 110 when the detected SOC exceeds the reference SOC. Meanwhile, the processor 161 maintains the operation of the fuel cell 110 when the detected SOC does not exceed the reference SOC.

Figure 5:
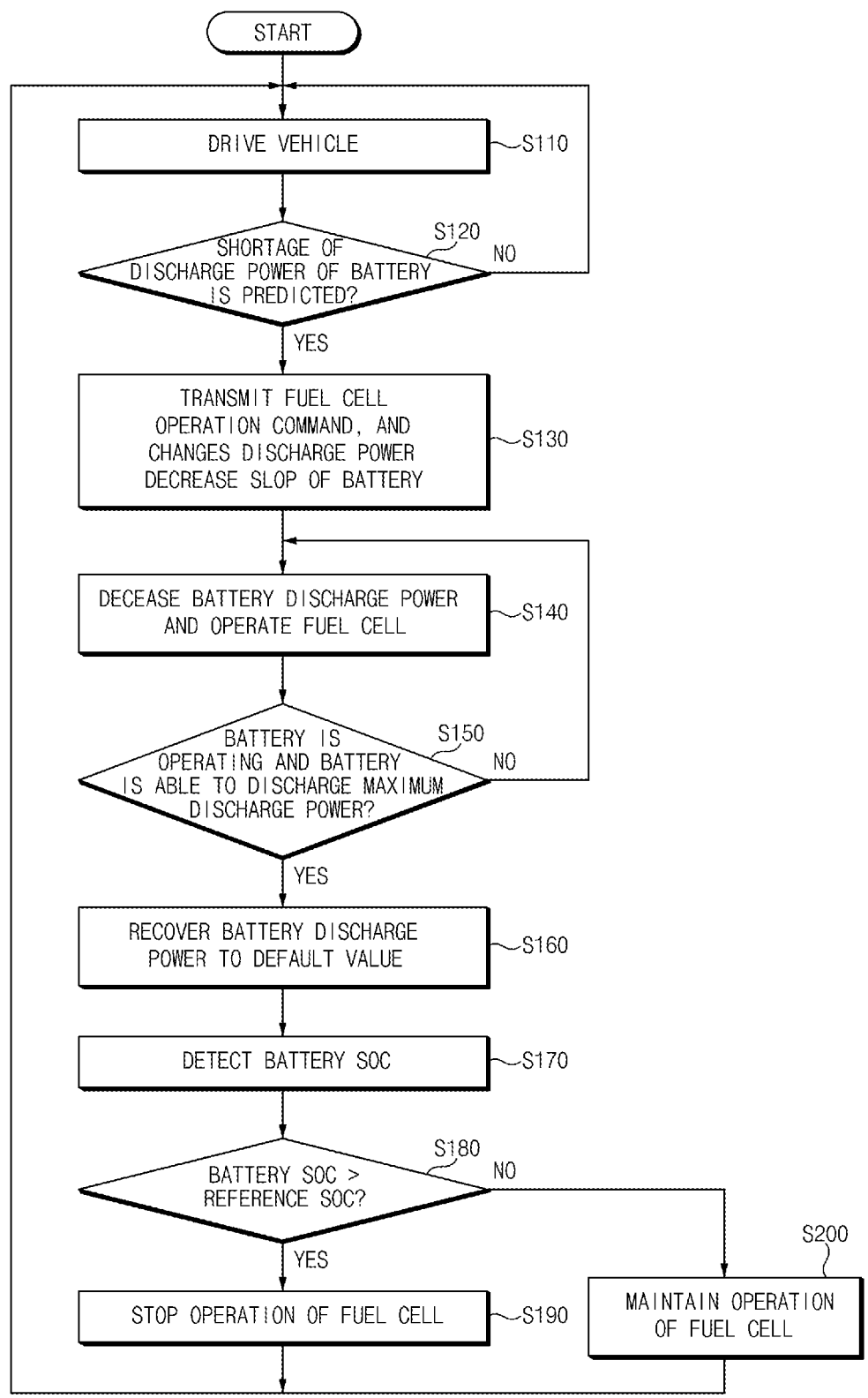
FIG. 5 is a flowchart illustrating a method for controlling power generation for the fuel cell vehicle, according to an exemplary embodiment of the present disclosure.

FIG. 5 is a flowchart illustrating a method for controlling power generation for the fuel cell vehicle, according to an exemplary embodiment of the present disclosure.

Referring to FIG. 5, the vehicle controller 160 drives the vehicle 100 in the EV mode (S110). The vehicle controller 160 drives the motor 150 using power supplied from the battery 130.

The vehicle controller 160 determines whether a shortage of the discharge power of the battery 130 is predicted, by monitoring the discharge power of the battery 130 (S120). The vehicle controller 160 determines that the shortage of the discharge power of the battery 130 is predicted, when the battery 130 is discharged for a preset reference time or more with a preset reference current.

The vehicle controller 160 transmits, to the fuel cell controller 120, a fuel cell operation command, and changes the discharge power decrease slope of the battery 130 when the shortage of the discharge power of the battery 130 is predicted (S130). The fuel cell controller 120 performs self-inspection for the state of the fuel cell 110 when receiving the fuel cell operation command. The fuel cell controller 120 increases power by operating the fuel cell 110 when the state of the fuel cell 110 is normal according to the inspection of the state of the fuel cell 110.

The vehicle controller 160 decreases the discharge power of the battery 130 based on the discharge power decrease slope of the battery 130 when the time point at which the discharge power of the battery 130 begins to decrease is reached during the operation (S140). The vehicle controller 160 drives the motor 150 using the discharge power of the battery 130 decreased based on the discharge power decrease slope of the battery 130.

The vehicle controller 160 determines whether the fuel cell 110 is operating, and whether the battery 130 is able to discharge the maximum discharge power (S150). The vehicle controller 160 determines whether the fuel cell 110 is operating, through the fuel cell controller 120. In addition, the vehicle controller 160 determines (diagnoses) the state, such as a battery temperature, a battery cell state, and the states of various sensors, of the battery 130, to determine whether the battery 130 is able to discharge the maximum discharge power.

The vehicle controller 160 recovers the discharge power of the battery 130 to the default value when the fuel cell 110 is operating (in an operating state) and the battery 130 is able to discharge the maximum discharge power (S160). The vehicle controller 160 increases the battery discharge power (battery power) based on a battery discharge power increase slope obtained by multiplying the discharge power decrease slope of the battery 130, which is determined in S130, by a negative number.

Subsequently, the vehicle controller 160 detects the SOC of the battery 130 (S170). The vehicle controller 160 determines whether the detected SOC of the battery 130 exceeds the reference SOC (S180). In this case, the reference SOC is a value preset by the designer.

When the SOC of the battery 130 exceeds the reference SOC, the vehicle controller 160 stops the operation of the fuel cell (S190). The vehicle controller 160 transmits a command for stopping the operation of the fuel cell to the fuel cell controller 120. Meanwhile, the processor 161 maintains the operation of the fuel cell 110 when the SOC of the battery 130 does not exceed the reference SOC (S200).

Figure 6:
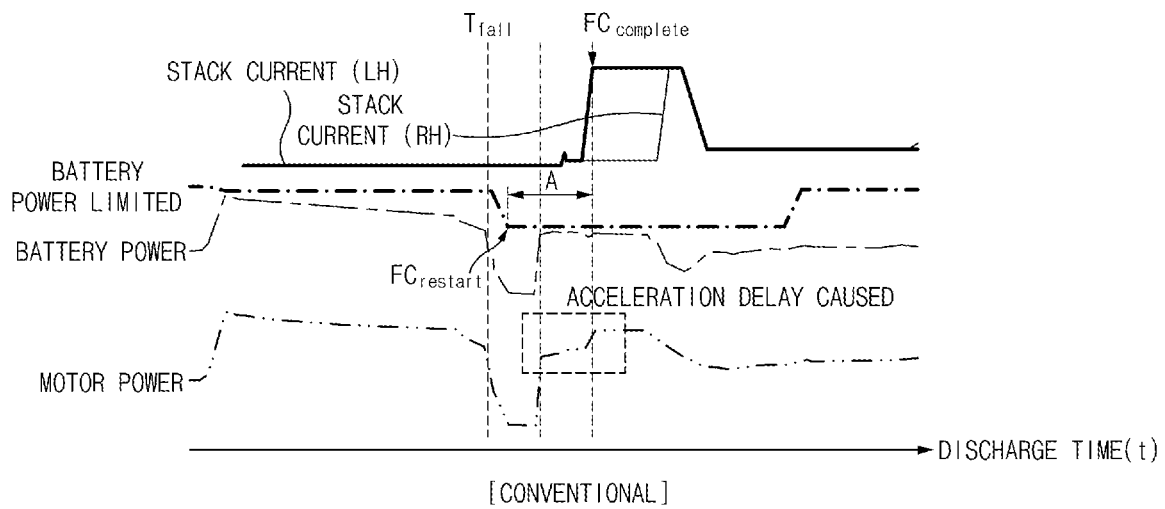
FIG. 6 is a view illustrating the comparison in motor power between an exemplary embodiment of the present disclosure and a related art.
Figure 6:
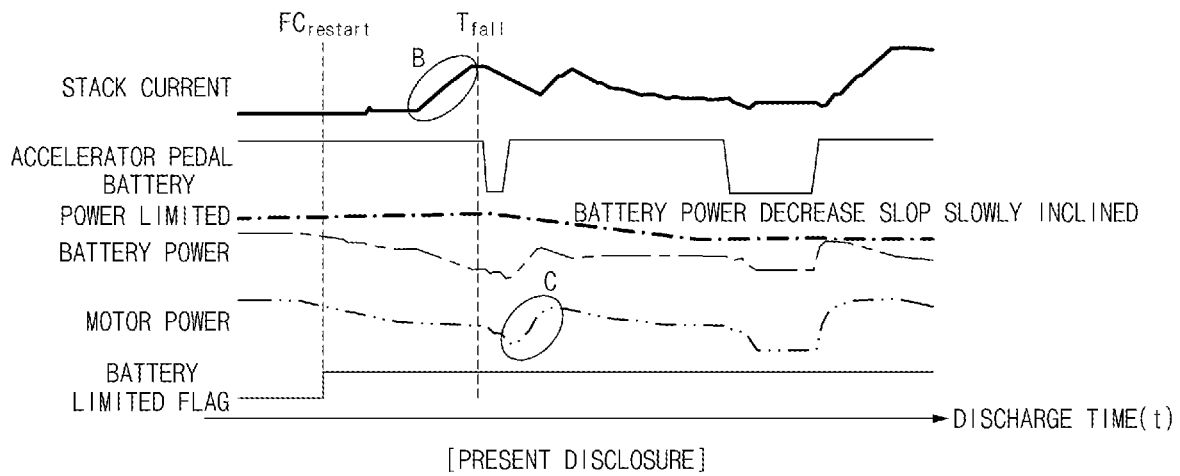

FIG. 6 is a view illustrating the comparison in motor power between an exemplary embodiment of the present disclosure and a related art.

Referring to FIG. 6, conventionally, as a fuel cell is operated (started) after the time point $T_{fall}$ at which the discharge power of the battery starts to decrease, 100% of power is supplied at the time point $FC_{complete}$. Accordingly, acceleration delay is caused when the accelerator pedal is pressed for a time A required until the fuel cell system is in a normal state.

Meanwhile, according to an exemplary embodiment of the present disclosure, since the fuel cell 110 is operated before the time point $T_{fall}$ at which the discharge power of the battery 130 starts to decrease, the shortage of the discharge power at the section B is supplemented with the power of the fuel cell 110. In addition, since even the discharge power (discharge output) decrease slope of the battery 130 is slowly inclined, even if the power required for driving the motor 150 is increased as in section C, the power required to drive the motor 150 is supplemented with the power of the fuel cell 110 and the battery 130, thereby overcoming the acceleration delay due to the shortage of the available power of the fuel cell 110 and the battery 130.

Figure 7:
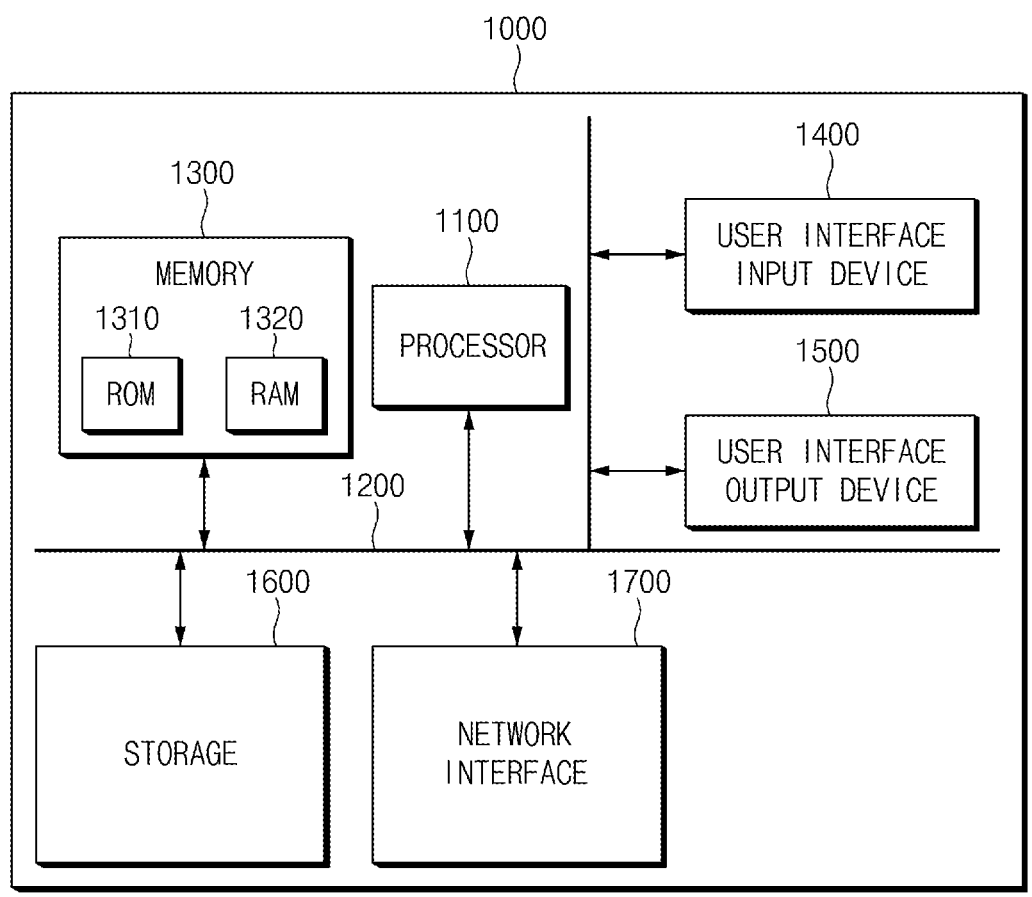
FIG. 7 is a block diagram illustrating a computing system to execute the method for controlling power generation of a fuel cell vehicle, according to an exemplary embodiment of the present disclosure.

FIG. 7 is a block diagram illustrating a computing system to execute the method for controlling power generation for the fuel cell vehicle, according to an exemplary embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random access memory (RAM; see 1320).

Thus, the operations of the methods or algorithms described in connection with the exemplary embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor 1100 and storage medium may reside in an application specific integrated circuit (ASIC). The ASIC may reside in a user terminal. Alternatively, the processor 1100*r* and the storage medium may reside as separate components of the terminal of the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

As described above, according to the present disclosure, driving power is supplied by operating the fuel cell based on the battery discharge power cell, before the available power is shorted, thereby preventing acceleration delay from being caused due to the shortage of power in restarting for the duration in which the battery discharge power is reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A fuel cell vehicle comprising:
 a motor configured to supply driving power for driving the fuel cell vehicle;
 a fuel cell and a battery configured to supply electrical power for driving the motor; and
 a vehicle controller configured to:
 predict a shortage of discharge power of the battery by monitoring the discharge power of the battery, and
 control an operation of the fuel cell before there is the shortage of the discharge power of the battery, when the shortage of the discharge power of the battery is predicted,
 wherein the vehicle controller is configured to determine a time point for instructing the operation of the fuel cell based on the following factors: 1) a time point at which the discharge power of the battery begins to decrease and 2) present maximum discharge power of the battery, when the shortage of the discharge power of the battery is predicted.

2. The fuel cell vehicle of claim 1, wherein the vehicle controller determines that the shortage of the discharge power of the battery is predicted when the battery is discharged for a preset reference time or more with a preset reference current or more.

3. The fuel cell vehicle of claim 1, further comprising:
 a fuel cell controller configured to control the operation of the fuel cell,
 wherein the vehicle controller transmits a fuel cell operation command to the fuel cell controller to operate the fuel cell controller when the shortage of the discharge power of the battery is predicted.

4. The fuel cell vehicle of claim 3, wherein the vehicle controller determines the time point for instructing the operation of the fuel cell, based on the maximum discharge power of the battery and the present maximum discharge power of the battery.

5. The fuel cell vehicle of claim 3, wherein the vehicle controller changes a discharge power decrease slope of the battery, based on the maximum discharge power of the battery and the present maximum discharge power of the battery.

6. The fuel cell vehicle of claim 5, wherein the vehicle controller decreases the discharge power of the battery based on the discharge power decrease slope of the battery, at a time point at which the discharge power of the battery begins to decrease.

7. The fuel cell vehicle of claim 6, wherein the vehicle controller determines whether the battery is able to discharge power as the maximum discharge power, and recovers the discharge power of the battery to a default value when the battery is able to discharge the power as the maximum discharge power.

8. The fuel cell vehicle of claim 7, wherein the vehicle controller determines whether to stop the operation of the fuel cell by comparing a State of Charge (SOC) of the battery with a reference SOC.

9. The fuel cell vehicle of claim 8, wherein the vehicle controller stops the operation of the fuel cell when the SOC of the battery exceeds the reference SOC.

10. The fuel cell vehicle of claim 8, wherein the vehicle controller maintains the operation of the fuel cell when the SOC of the battery does not exceed the reference SOC.

\* \* \* \* \*